US012140882B2

(12) United States Patent
Minoshima et al.

(10) Patent No.: US 12,140,882 B2
(45) Date of Patent: Nov. 12, 2024

(54) DEVELOPING CARTRIDGE INCLUDING ELECTRICAL CONTACT SURFACE POSITIONED AWAY FROM DEVELOPING ROLLER

(71) Applicant: BROTHER KOGYO KABUSHIKI KAISHA, Nagoya (JP)

(72) Inventors: Saya Minoshima, Gifu (JP); Tomitake Aratachi, Toyokawa (JP); Keita Shimizu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/354,091

(22) Filed: Jul. 18, 2023

(65) Prior Publication Data

US 2023/0359137 A1 Nov. 9, 2023

Related U.S. Application Data

(63) Continuation of application No. PCT/JP2022/006566, filed on Feb. 18, 2022.

(30) Foreign Application Priority Data

Feb. 25, 2021 (JP) ................................ 2021-029023

(51) Int. Cl.
*G03G 15/08* (2006.01)
*G03G 21/18* (2006.01)

(52) U.S. Cl.
CPC ..... *G03G 15/0867* (2013.01); *G03G 15/0808* (2013.01); *G03G 21/1839* (2013.01);
(Continued)

(58) Field of Classification Search
CPC ......... G03G 15/0808; G03G 15/08667; G03G 21/1839
(Continued)

(56) References Cited

U.S. PATENT DOCUMENTS

2008/0199204 A1 8/2008 Ishii et al.
2008/0212993 A1 9/2008 Ishii et al.
(Continued)

FOREIGN PATENT DOCUMENTS

JP 2008-203566 A 9/2008
JP 2011-133767 A 7/2011
(Continued)

OTHER PUBLICATIONS

International Search Report issued in related PCT/JP2022/006566, mailed Apr. 26, 2022.
(Continued)

*Primary Examiner* — Hoan H Tran
(74) *Attorney, Agent, or Firm* — Merchant & Gould P.C.

(57) ABSTRACT

A developing cartridge includes: a casing; a developing roller rotatable about a developing axis extending in a first direction and positioned at one end portion of the casing in a second direction crossing the first direction; a developing electrode electrically connected to the developing roller and positioned at one end portion of the casing in the first direction; a supply roller rotatable about a supply axis extending in the first direction and configured to supply toner to the developing roller; a supply electrode electrically connected to the supply roller and positioned at one end portion of the casing in the first direction; and an IC chip having an electrical contact surface positioned at one end portion of the casing in the first direction. The electrical contact surface is positioned opposite the developing electrode in the second direction with respect to a part of the supply electrode.

23 Claims, 11 Drawing Sheets

(52) U.S. Cl.
CPC ............. *G03G 2215/00679* (2013.01); *G03G 2215/025* (2013.01); *G03G 2215/0643* (2013.01); *G03G 2215/066* (2013.01); *G03G 2221/1654* (2013.01)

(58) Field of Classification Search
USPC .................................. 399/107, 110, 111, 262
See application file for complete search history.

(56) References Cited

U.S. PATENT DOCUMENTS

| | | | |
|---|---|---|---|
| 2014/0205314 | A1 | 7/2014 | Chang et al. |
| 2017/0184998 | A1 | 6/2017 | Itabashi |
| 2018/0004123 | A1 | 1/2018 | Itabashi et al. |
| 2018/0107155 | A1 | 4/2018 | Shimizu et al. |
| 2018/0284647 | A1 | 10/2018 | Yokoi |

FOREIGN PATENT DOCUMENTS

| | | | |
|---|---|---|---|
| JP | 2014-016498 | A | 1/2014 |
| JP | 2017-116826 | A | 6/2017 |
| JP | 2018-4907 | A | 1/2018 |
| JP | 2018-066973 | A | 4/2018 |
| JP | 2018146830 | * | 9/2018 |
| JP | 2018-173480 | A | 11/2018 |

OTHER PUBLICATIONS

International Preliminary Report on Patentability issued in corresponding International Patent Application No. PCT/JP2022/006566, Aug. 29, 2023.

* cited by examiner

DEVELOPING CARTRIDGE INCLUDING ELECTRICAL CONTACT SURFACE POSITIONED AWAY FROM DEVELOPING ROLLER

REFERENCE TO RELATED APPLICATIONS

This is a continuation application of International Application No. PCT/JP2022/006566 filed on Feb. 18, 2022 which claims priority from Japanese Patent Application No. 2021-029023 filed on Feb. 25, 2021. The entire contents of the earlier applications are incorporated herein by reference.

BACKGROUND ART

Conventionally, as a developing cartridge, there has been known a developing cartridge that includes a casing, a developing roller, a supply roller, a developing electrode, a supply electrode, and an IC chip. The developing roller is rotatable about a developing axis extending in a first direction. The developing roller is positioned at one end portion of the casing in a second direction crossing the first direction. The supply roller is rotatable about a supply axis extending in the first direction. The supply roller is configured to supply toner to the developing roller. The developing electrode is configured to supply electricity to the developing roller. The supply electrode is configured to supply electricity to the supply roller. The IC chip has an electrical contact surface.

In this technique, the electrical contact surface is positioned at one end portion of the casing in the first direction. The developing electrode and the supply electrode are positioned at another end portion of the casing in the first direction. Further, in the second direction, the electrical contact surface is at generally at the same position as the developing electrode.

DESCRIPTION

However, according to the conventional art, since the position of the electrical contact surface is approximately the same as the position of the developing electrode in the second direction, the electrical contact surface is positioned near the developing roller. Accordingly, it is likely that the electrical contact surface may be contaminated by toner scattering from the developing roller.

In view of the foregoing, it is an object of the present disclosure to restrain the electrical contact surface from getting contaminated with toner.

In order to solve the above-described problem, according to one aspect, the disclosure provides a developing cartridge that includes a casing configured to accommodate toner therein, a developing roller rotatable about a developing axis extending in a first direction and positioned at one end portion of the casing in a second direction crossing the first direction, a developing electrode electrically connected to the developing roller and positioned at one end portion of the casing in the first direction, a supply roller rotatable about a supply axis extending in the first direction and configured to supply toner to the developing roller, a supply electrode electrically connected to the supply roller and positioned at the one end portion of the casing in the first direction, and an IC chip having an electrical contact surface positioned at the one end portion of the casing in the first direction. The electrical contact surface is positioned opposite the developing electrode with respect to a part of the supply electrode in the second direction.

With this structure, since the electrical contact surface is positioned opposite the developing electrode with respect to the part of the supply electrode in the second direction, the electrical contact surface can be positioned far away from the developing roller. The electrical contact surface can be thus restrained from being contaminated with toner.

Hereinafter, one embodiment of the present disclosure will be described with reference to the accompanying drawings.

Figure 1:
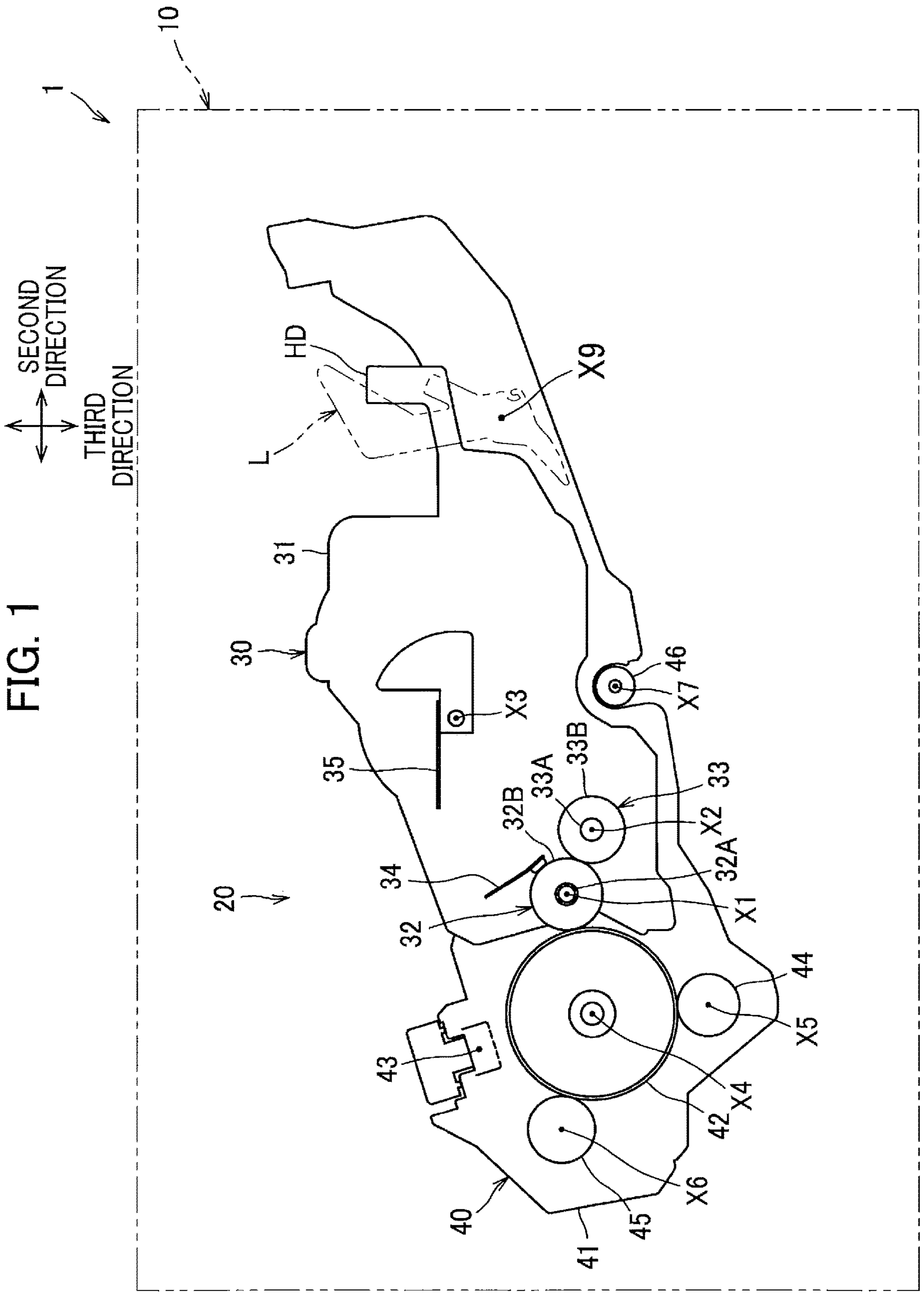
FIG. 1 is a view illustrating a structure of a process cartridge.

As illustrated in FIG. 1, an image forming apparatus 1 includes a main housing 10, and a process cartridge 20. Incidentally, as a matter of convenience, in FIG. 1, the main housing 10 is illustrated in a smaller size.

The process cartridge 20 is attachable to and detachable from the main housing 10. The process cartridge 20 includes a developing cartridge 30, and a drum cartridge 40. The developing cartridge 30 is attachable to and detachable from a drum frame 41 (described later) of the drum cartridge 40.

The developing cartridge 30 includes a casing 31, a developing roller 32, a supply roller 33, a layer thickness regulation blade 34, an agitator 35, and a handle HD. The casing 31 is configured to accommodate toner therein. The casing 31 has a first outer surface F1 (described later), and a second outer surface F2 (see FIG. 2, described later) positioned apart from the first outer surface F1 in a first direction.

The developing roller 32 is a roller configured to supply toner to a photosensitive drum 42 (described later). The developing roller 32 is rotatable about a developing axis X1 extending in the first direction. The developing roller 32 is positioned at one end portion of the casing 31 in a second direction crossing the first direction. Preferably, the second direction be perpendicular to the first direction. In the present embodiment, the second direction is perpendicular to the first direction. Further, in the present embodiment, the second direction is defined as a direction along an electrical contact surface C11 (described later).

Further, in the present embodiment, a direction perpendicular to the first direction and the second direction will be defined as a third direction. Further, in the present embodiment, the third direction is assumed to be perpendicular to the electrical contact surface C11 (described later). Incidentally, the third direction may be any direction as long as the third direction crosses the first direction and the second direction.

The developing roller 32 includes a developing-roller shaft 32A having a columnar shape, and a roller portion 32B having a hollow cylindrical shape. The developing-roller shaft 32A is made of metal, for example. The developing-roller shaft 32A extends in the first direction. The roller portion 32B is made of rubber, for example. The roller portion 32B covers a part of the developing-roller shaft 32A.

The handle HD is configured to be gripped by a user. The handle HD has a U-shape (see FIG. 2). The handle HD is positioned at another end portion of the casing 31 in the second direction.

The supply roller 33 is a roller configured to supply toner to the developing roller 32. The supply roller 33 is rotatable about a supply axis X2 extending in the first direction. The supply roller 33 is positioned between the developing roller 32 and the handle HD in the second direction. Specifically, the supply axis X2 is positioned between the developing axis X1 and the handle HD in the second direction.

The supply roller 33 includes a supply-roller shaft 33A having a columnar shape, and a roller portion 33B having a hollow cylindrical shape. The supply-roller shaft 33A is made of metal, for example. The supply-roller shaft 33A extends in the first direction. The roller portion 33B is made of rubber, for example. The roller portion 33B covers a part of the supply-roller shaft 33A. The roller portion 33B is in contact with the roller portion 32B of the developing roller 32.

The layer thickness regulation blade 34 is a member configured to regulate a thickness of a toner layer formed on the developing roller 32. The layer thickness regulation blade 34 is in contact with the roller portion 32B of the developing roller 32.

The agitator 35 is configured to agitate toner accommodated in the casing 31. Also, the agitator 35 is configured to supply the toner to the supply roller 33. The agitator 35 is rotatable about an agitator axis X3 extending in the first direction.

The drum cartridge 40 includes the drum frame 41, the photosensitive drum 42, a charger 43, a transfer roller 44, a cleaning roller 45, a conveying roller 46, and a lock lever L. The photosensitive drum 42 is rotatable about a drum axis X4 extending in the first direction.

The charger 43 is configured to charge the photosensitive drum 42. The charger 43 is a Scorotron charger positioned away from the photosensitive drum 42.

The transfer roller 44 is a roller configured to transfer the toner on the photosensitive drum 42 to a non-illustrated sheet. The transfer roller 44 is rotatable about a transfer axis X5 extending in the first direction. The transfer roller 44 is in contact with the photosensitive drum 42. The photosensitive drum 42 is positioned between the charger 43 and the transfer roller 44 in the third direction.

The cleaning roller 45 is a roller configured to remove the toner deposited on the photosensitive drum 42. The cleaning roller 45 is rotatable about a cleaning axis X6 extending in the first direction. The cleaning roller 45 is in contact with the photosensitive drum 42.

The conveying roller 46 is a roller configured to convey the sheet toward the photosensitive drum 42. The conveying roller 46 is rotatable about a conveying axis X7 extending in the first direction.

Figure 2:
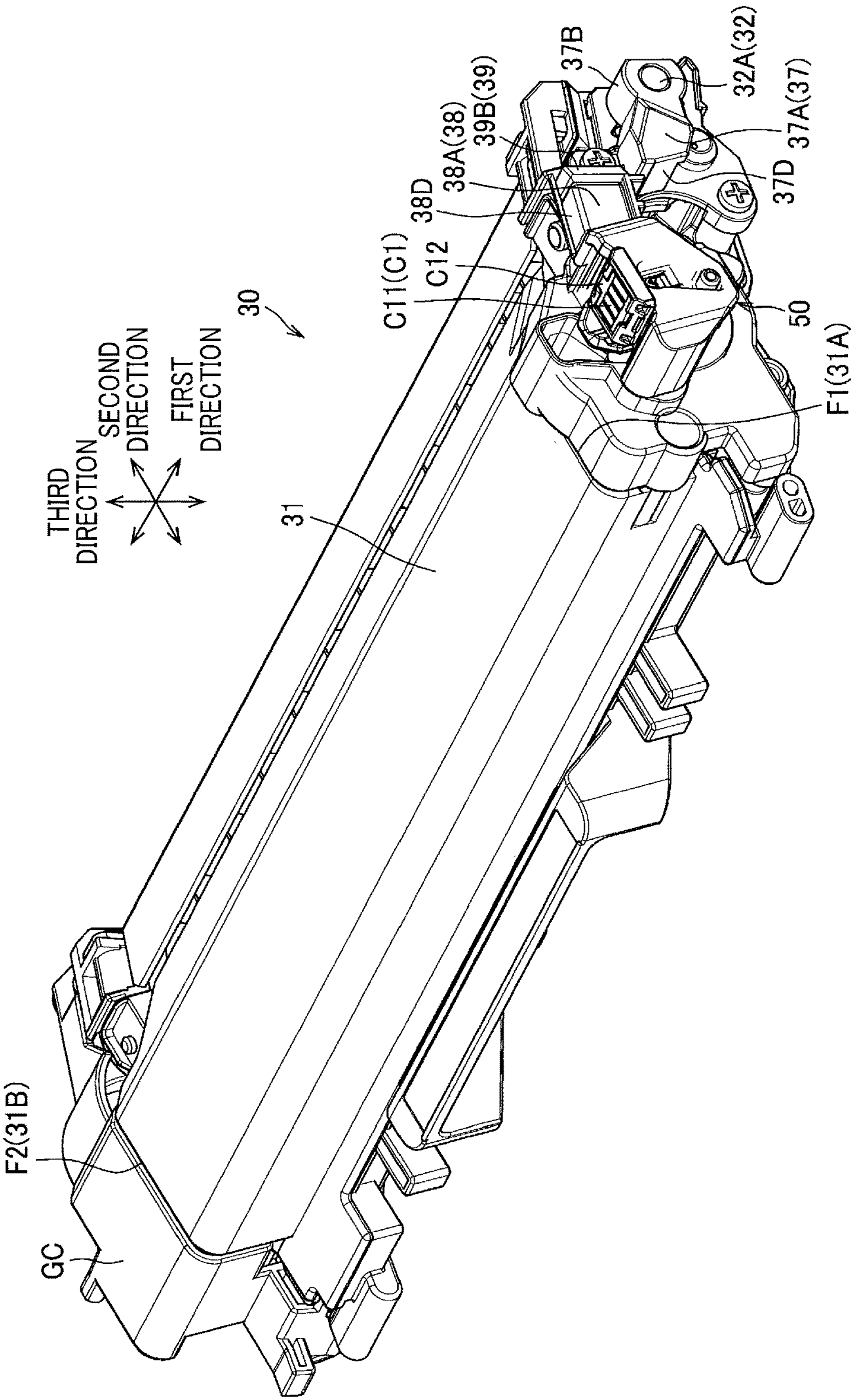
FIG. 2 is a perspective view for description of a structure of one end portion of the developing cartridge in a first direction.

As illustrated in FIG. 2, the developing cartridge 30 further includes an IC chip C1, a developing electrode 37, a supply electrode 38, an insulating member 39, and a chip holder 50. The IC chip C1, the developing electrode 37, the supply electrode 38, and the chip holder 50 are positioned at one end portion 31A of the casing 31 in the first direction. In other words, the IC chip C1, the developing electrode 37, the supply electrode 38, and the chip holder 50 are positioned at the first outer surface F1 of the casing 31.

The IC chip C1 is configured to store development information relating to the developing cartridge 30. The development information may be a residual amount of toner in the developing cartridge 30, and a service life of the developing roller 32, for example. The IC chip C1 includes the electrical contact surface C11, and a circuit board C12 incorporating a memory storing the development information. The electrical contact surface C11 is electrically connected to the memory. The electrical contact surface C11 is positioned at the one end portion 31A of the casing 31 in the first direction. In a state where the process cartridge 20 is attached to the main housing 10, the electrical contact surface C11 contacts a main contact 13 (described later, see FIG. 6).

The developing electrode 37 is electrically connected to the developing roller 32. The developing electrode 37 is made of electrically conductive resin. The developing electrode 37 includes a developing protrusion 37D having a developing electrode surface 37A, and a developing bearing 37B. The developing protrusion 37D protrudes in the first direction. The developing electrode surface 37A is positioned at a tip end of the developing protrusion 37D in the first direction. The developing electrode surface 37A is configured to contact a developing main electrode (not illustrated) of the main housing 10. The developing electrode surface 37A extends perpendicular to the first direction. The developing electrode surface 37A is electrically connected to the developing bearing 37B. The developing protrusion 37D is positioned at the one end portion 31A of the casing 31 in the first direction. In other words, the developing protrusion 37D is positioned at the first outer surface F1 of the casing 31. The developing electrode surface 37A is positioned at the one end portion 31A of the casing 31 in the first direction. In other words, the developing electrode surface 37A is positioned at the first outer surface F1 of the casing 31. The developing bearing 37B has a developing through-hole 37C (see FIG. 3) through which the developing-roller shaft 32A is inserted.

Figure 3:
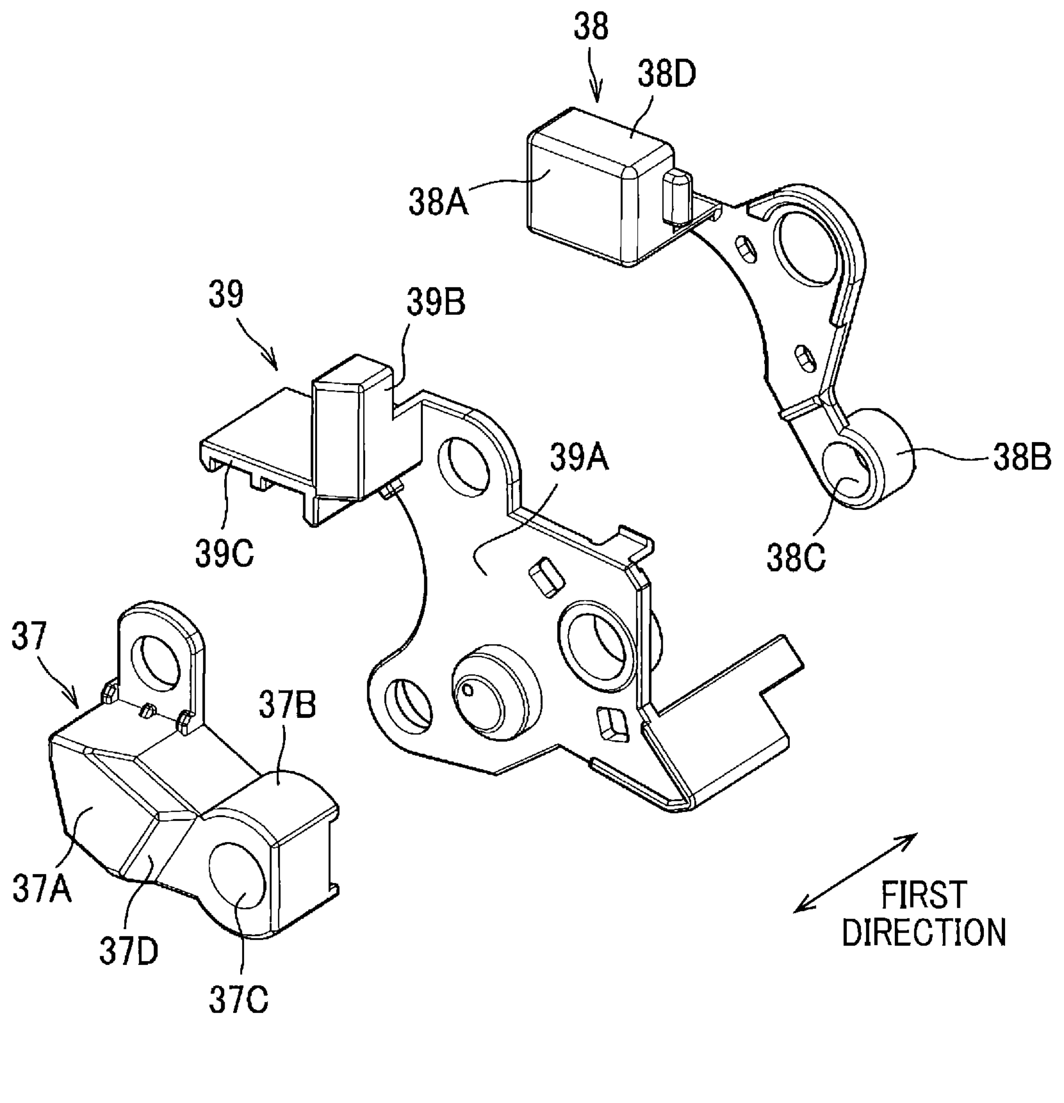
FIG. 3 is an exploded perspective view illustrating a developing electrode, a supply electrode, and an insulating member.

The supply electrode 38 is electrically connected to the supply roller 33 (see FIG. 1). The supply electrode 38 is made of electrically conductive resin. As illustrated in FIG. 3, the supply electrode 38 includes a supply protrusion 38D having a supply electrode surface 38A, and a supply bearing 38B. The supply protrusion 38D protrudes in the first direction. The supply electrode surface 38A is positioned at a tip end of the supply protrusion 38D in the first direction. The supply electrode surface 38A is configured to contact a supply main electrode (not illustrated) of the main housing 10. The supply electrode surface 38A extends perpendicular to the first direction. The supply electrode surface 38A is electrically connected to the supply bearing 38B. The supply protrusion 38D is positioned at the one end portion 31A of the casing 31 in the first direction. In other words, the supply protrusion 38D is positioned at the first outer surface F1 of the casing 31. The supply electrode surface 38A is positioned at the one end portion 31A of the casing 31 in the first direction. In other words, the supply electrode surface 38A is positioned at the first outer surface F1 of the casing 31. The supply bearing 38B has a supply through-hole 38C through which the supply-roller shaft 33A (see FIG. 1) is inserted.

Figure 5:
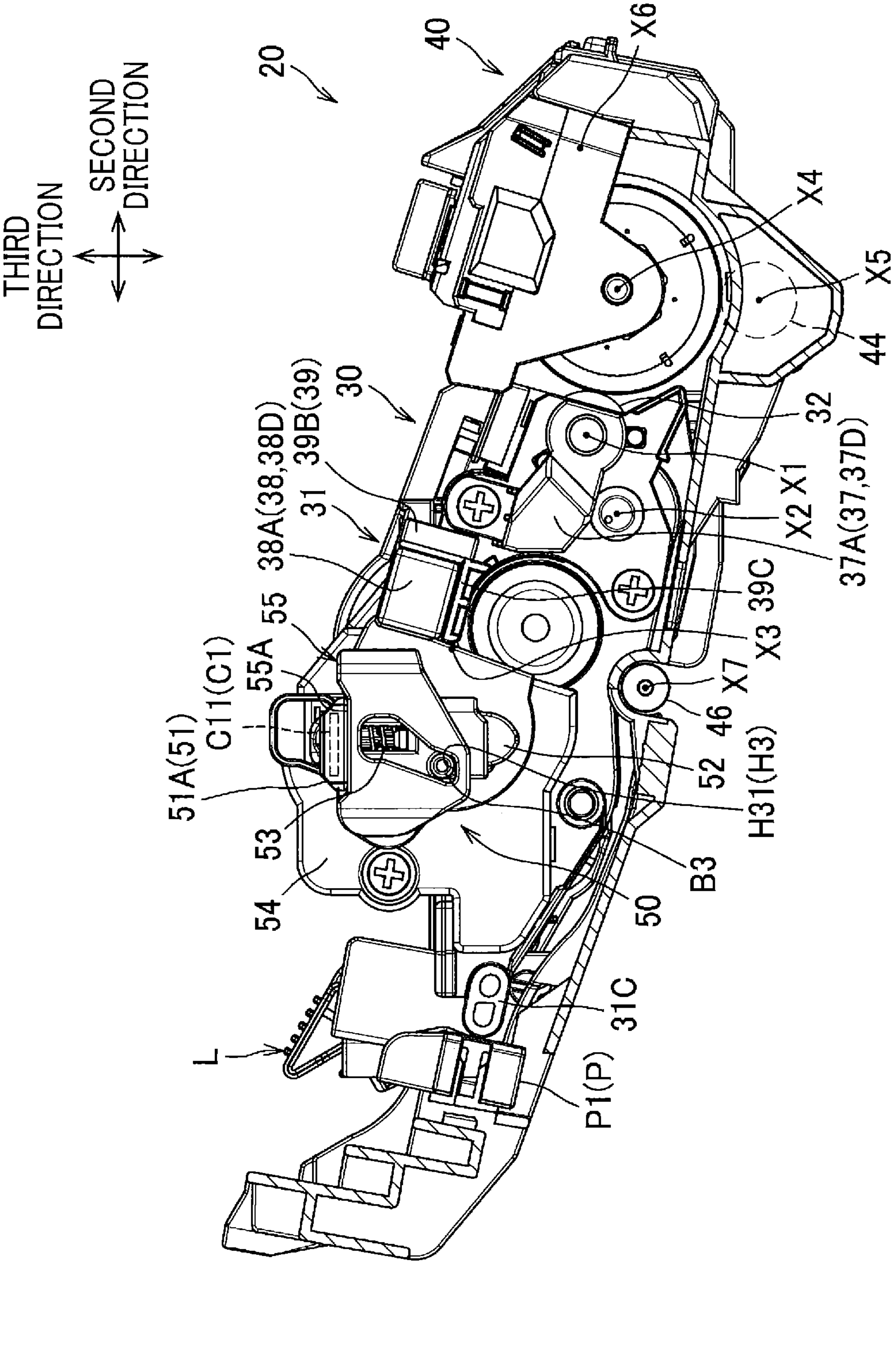
FIG. 5 is a side view of the process cartridge in which a side wall at one end portion of a drum frame in the first direction is removed, and illustrating a state prior to attachment of the process cartridge to a main housing.

The insulating member 39 is made of insulation resin, for example. The insulating member 39 is positioned between the developing electrode 37 and the supply electrode 38. Specifically, the insulating member 39 includes a plate-shaped part 39A, a first wall part 39B, and a second wall part 39C. The plate-shaped part 39A is positioned between the developing electrode 37 and the supply electrode 38 in the first direction. The first wall part 39B and the second wall part 39C extend from the plate-shaped part 39A in a direction away from the casing 31. As illustrated in FIG. 5, the first wall part 39B is positioned on a side of the supply electrode surface 38A in the second direction, the side being closer to the developing axis X1. The second wall part 39C is positioned on a side of the supply electrode surface 38A in the third direction, the side being closer the developing axis X1. A part of the first wall part 39B and a part of the second wall part 39C are positioned between the developing electrode surface 37A and the supply electrode surface 38A in a direction perpendicular to the first direction.

The electrical contact surface C11 is positioned opposite the developing electrode 37 with respect to the supply electrode surface 38A in the second direction. In other words, the electrical contact surface C11 is positioned opposite the developing electrode 37 with respect to the supply electrode surface 38A, which is a part of the supply electrode 38, in the second direction. Stated differently, the electrical contact surface C11 is positioned opposite the developing protrusion 37D with respect to the supply protrusion 38D in the second direction.

Further, the electrical contact surface C11 is positioned opposite the developing electrode surface 37A with respect to the supply electrode surface 38A in the third direction. In other words, the electrical contact surface C11 is positioned opposite the developing electrode 37 with respect to the supply electrode surface 38A, which is the part of the supply electrode 38, in the third direction. Stated differently, the electrical contact surface C11 is positioned opposite the developing protrusion 37D with respect to the supply protrusion 38D in the third direction. The electrical contact surface C11 extends perpendicular to the third direction.

Figure 11:
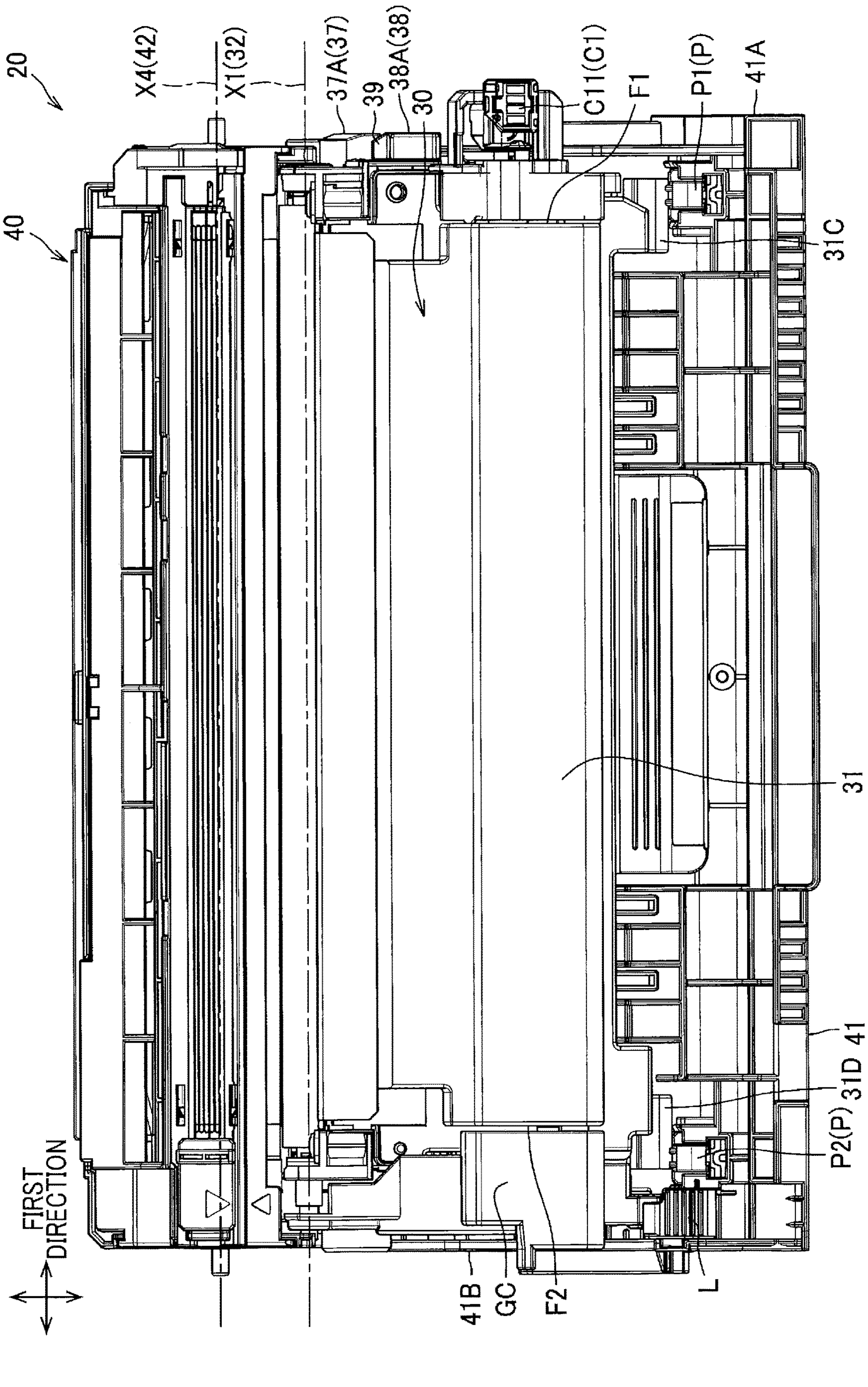
FIG. 11 is a plan view illustrating the process cartridge.

As illustrated in FIG. 11, a distance in the first direction between the first outer surface F1 of the casing 31 and the electrical contact surface C11 is greater than a distance in the first direction between the first outer surface F1 of the casing 31 and the developing electrode 37. In other words, the distance in the first direction between the first outer surface F1 of the casing 31 and the electrical contact surface C11 is greater than a distance in the first direction between the first outer surface F1 of the casing 31 and the developing electrode surface 37A.

The distance in the first direction between the first outer surface F1 of the casing 31 and the electrical contact surface C11 is greater than a distance in the first direction between the first outer surface F1 of the casing 31 and the supply electrode 38. In other words, the distance in the first direction between the first outer surface F1 of the casing 31 and the electrical contact surface C11 is greater than a distance in the first direction between the first outer surface F1 of the casing 31 and the supply electrode surface 38A.

The distance in the first direction between the first outer surface F1 of the casing 31 and the electrical contact surface C11 is greater than a distance in the first direction between the first outer surface F1 of the casing 31 and the insulating member 39.

Figure 4:
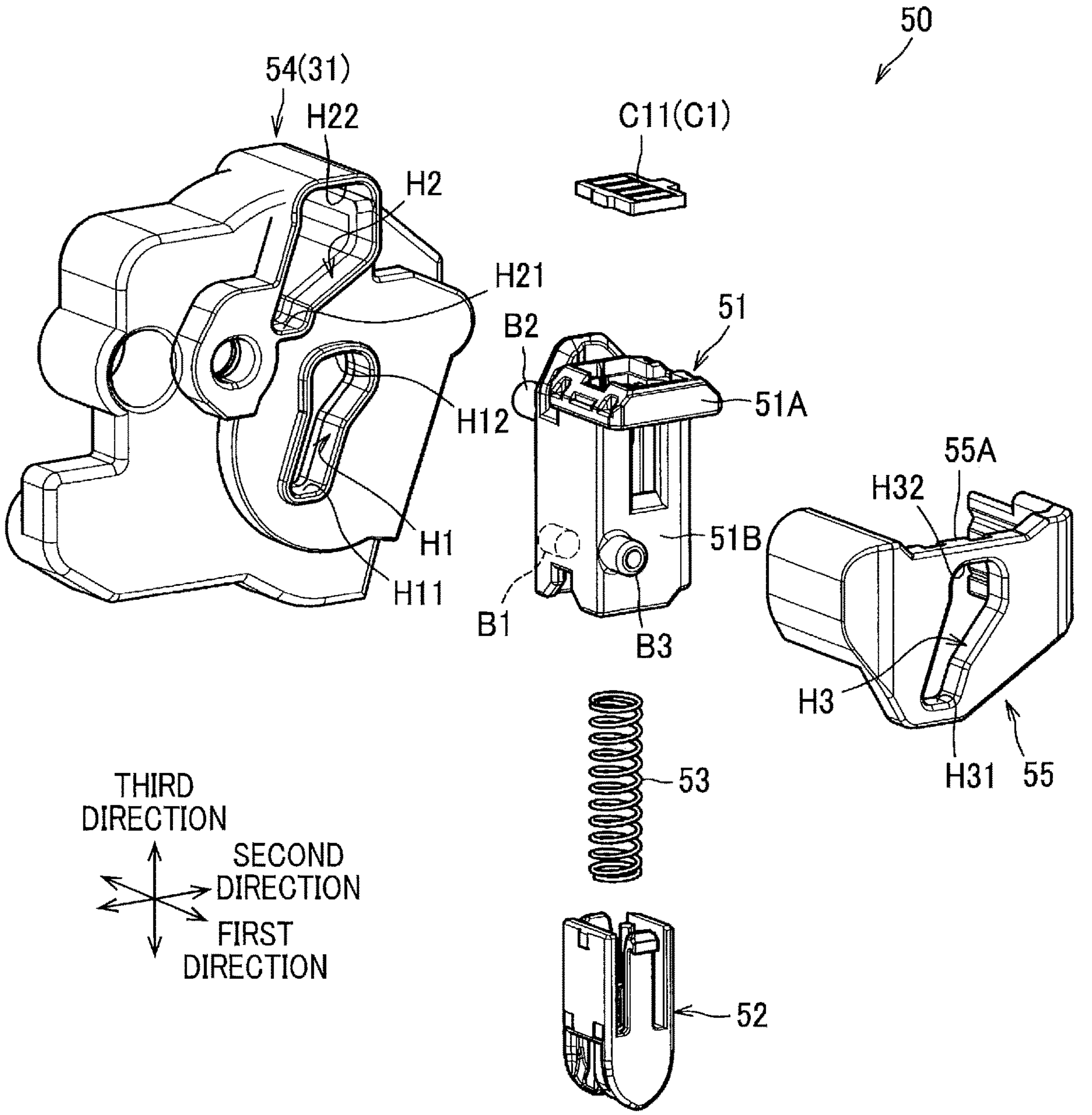
FIG. 4 is an exploded perspective view of a chip holder.

The chip holder 50 holds the IC chip C1 such that the electrical contact surface C11 is movable relative to the casing 31. As illustrated in FIG. 4, the chip holder 50 includes a holder 51, an advancing/retracting member 52, a spring 53, a first cover 54, and a second cover 55. The holder 51 is a member holding the IC chip C1. Further, the holder 51 supports the advancing/retracting member 52 such that the advancing/retracting member 52 is movable in the third direction.

The holder 51 includes a seat part 51A, a tubular part 51B, a first boss B1, a second boss B2, and a third boss B3. The seat part 51A is a part retaining the IC chip C1. The seat part 51A protrudes from the tubular part 51B toward the second cover 55 in the first direction.

The tubular part 51B has a hollow rectangular cylindrical shape. The tubular part 51B extends from the seat part 51A in a direction away from the IC chip C1. The first boss B1 and the second boss B2 protrude from the tubular part 51B toward the first cover 54 in the first direction. The third boss B3 protrudes from the tubular part 51B toward the second cover 55 in the first direction.

The spring 53 is positioned between the holder 51 and the advancing/retracting member 52. The spring 53 is a coil spring. The spring 53 urges the advancing/retracting member 52 in a direction away from the IC chip C1.

The first cover 54 is positioned at the first outer surface F1 of the casing 31. The first cover 54 has a first elongated slot H1 and a second elongated slot H2. The first boss B1 is inserted in the first elongated slot H1. The second boss B2 is inserted in the second elongated slot H2.

The second cover 55 is attached to the first cover 54. The tubular part 51B of the holder 51 is positioned between the first cover 54 and the second cover 55 in the first direction in a state where the second cover 55 is attached to the first cover 54. The second cover 55 has a third elongated slot H3. The third boss B3 is inserted in the third elongated slot H3. Further, the second cover 55 has a seat surface 55A configured to retain the seat part 51A.

The first elongated slot H1, the second elongated slot H2, and the third elongated slot H3 are holes elongated in the third direction. The first elongated slot H1 has one end portion H11 and another end portion H12 spaced away from the one end portion H11 in the third direction. The one end portion H11 has a length in the second direction that is shorter than a length in the second direction of the other end portion H12. The one end portion H11 is positioned below the other end portion H12 in the state where the process cartridge 20 is attached to the main housing 10. The one end portion H11 is configured to restrict movement of the first boss B1 in the second direction. The other end portion H12 is configured to allow the first boss B1 to move in the second direction.

The second elongated slot H2 has one end portion H21 and another end portion H22 spaced away from the one end portion H21 in the third direction. The one end portion H21 has a length in the second direction that is shorter than a length in the second direction of the other end portion H22. The one end portion H21 is positioned below the other end portion H22 in the state where the process cartridge 20 is attached to the main housing 10. The one end portion H21 is configured to restrict movement of the second boss B2 in the second direction. The other end portion H22 is configured to allow the second boss B2 to move in the second direction.

The third elongated slot H3 has one end portion H31 and another end portion H32 spaced away from the one end portion H31 in the third direction. The one end portion H31 has a length in the second direction that is shorter than a length in the second direction of the other end portion H32. The one end portion H31 is positioned below the other end portion H32 in the state where the process cartridge 20 is attached to the main housing 10. The one end portion H31 is configured to restrict movement of the third boss B3 in the second direction. The other end portion H32 is configured to allow the third boss B3 to move in the second direction.

Figure 6:
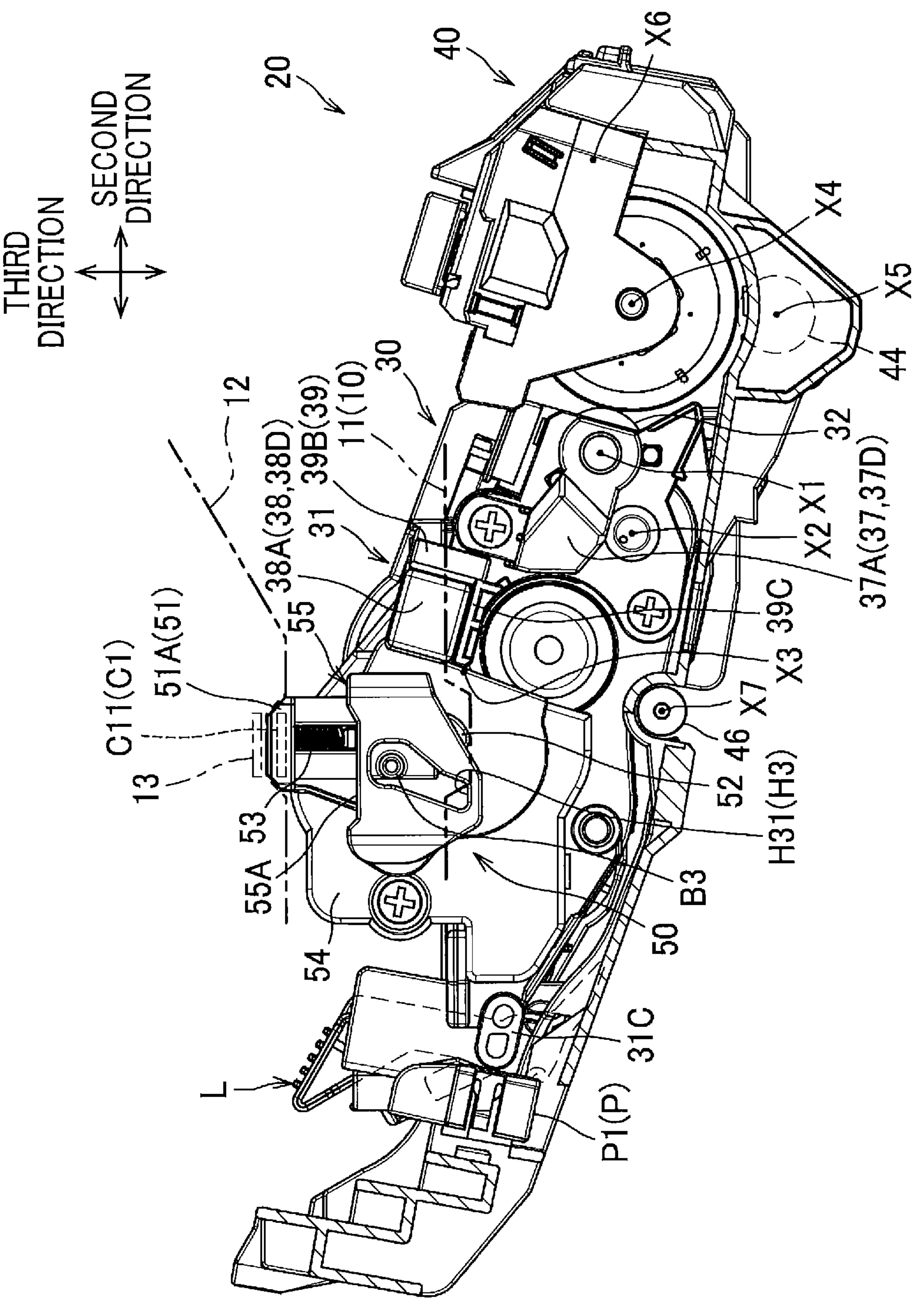
FIG. 6 is a side view of the process cartridge in which the side wall at the one end portion of the drum frame in the first direction is removed, and illustrating a state where the process cartridge is attached to the main housing.

With the chip holder 50 constructed as described above, the electrical contact surface C11 is movable between a first position indicated in FIG. 5 and a second position indicated in FIG. 6. As illustrated in FIG. 5, the electrical contact surface C11 is located at the first position in a state prior to attachment of the process cartridge 20 to the main housing 10. In a state where the electrical contact surface C11 is at the first position, the holder 51 is held by the first cover 54 and the second cover 55.

Specifically, the seat part 51A of the holder 51 is in contact with the seat surface 55A of the second cover 55 in the state where the electrical contact surface C11 is at the first position. Further, in the state where the electrical contact surface C11 is at the first position, the third boss B3 is in contact with the one end portion H31 of the third elongated slot H3. Although not illustrated, the first boss B1 is in contact with the one end portion H11 of the first elongated slot H1 and the second boss B2 is in contact with the one end portion H21 of the second elongated slot H2 in the state where the electrical contact surface C11 is at the first position.

As illustrated in FIG. 6, the electrical contact surface C11 is positioned farther away from the developing axis X1 in the third direction when the electrical contact surface C11 is at the second position than when the electrical contact surface C11 is at the first position. Further, the electrical contact surface C11 is positioned closer to the developing axis X1 in the second direction when the electrical contact surface C11 is at the second position than when the electrical contact surface C11 is at the first position. The electrical contact surface C11 is at the second position in the state where the process cartridge 20 is attached to the main housing 10. The main housing 10 includes a first guide 11, a second guide 12, and the main contact 13. The first guide 11 is a guide configured to contact a lower end of the advancing/retracting member 52 to guide the advancing/retracting member 52. The second guide 12 is a guide configured to contact an upper end of the holder 51 to guide the holder 51. The main contact 13 is a contact configured to contact the electrical contact surface C11 of the IC chip C1. The main contact 13 is configured to electrically connect the IC chip C1 to a controller (not illustrated). Incidentally, in FIG. 6, for the sake of convenience, the IC chip C1 and the main contact 13 are depicted as being separated away from each other.

In the state where the electrical contact surface C11 is at the second position, the holder 51 is held by the first guide 11 of the main housing 10 through the advancing/retracting member 52 and the spring 53. Further, in the state where the electrical contact surface C11 is at the second position, the seat part 51A of the holder 51 is separated upward from the seat surface 55A of the second cover 55. Further, the third boss B3 is separated away from an inner surface of the third elongated slot H3 in the state where the electrical contact surface C11 is at the second position. Although not illustrated in the drawings, the first boss B1 is separated away from an inner surface of the first elongated slot H1 in the state where the electrical contact surface C11 is at the second position. Further, the second boss B2 is separated away from an inner surface of the second elongated slot H2 in the state where the electrical contact surface C11 is at the second position. In the state where the electrical contact surface C11 is at the second position, the IC chip C1 is urged toward the main contact 13 by an urging force of the spring 53. The electrical contact surface C11 is in contact with the main contact 13 in the state where the electrical contact surface C11 is at the second position.

In the state where the process cartridge 20 is attached to the main housing 10, the third direction is parallel to an up-down direction. In the state where the process cartridge 20 is attached to the main housing 10, the electrical contact surface C11 is positioned above the developing axis X1.

Figure 7:
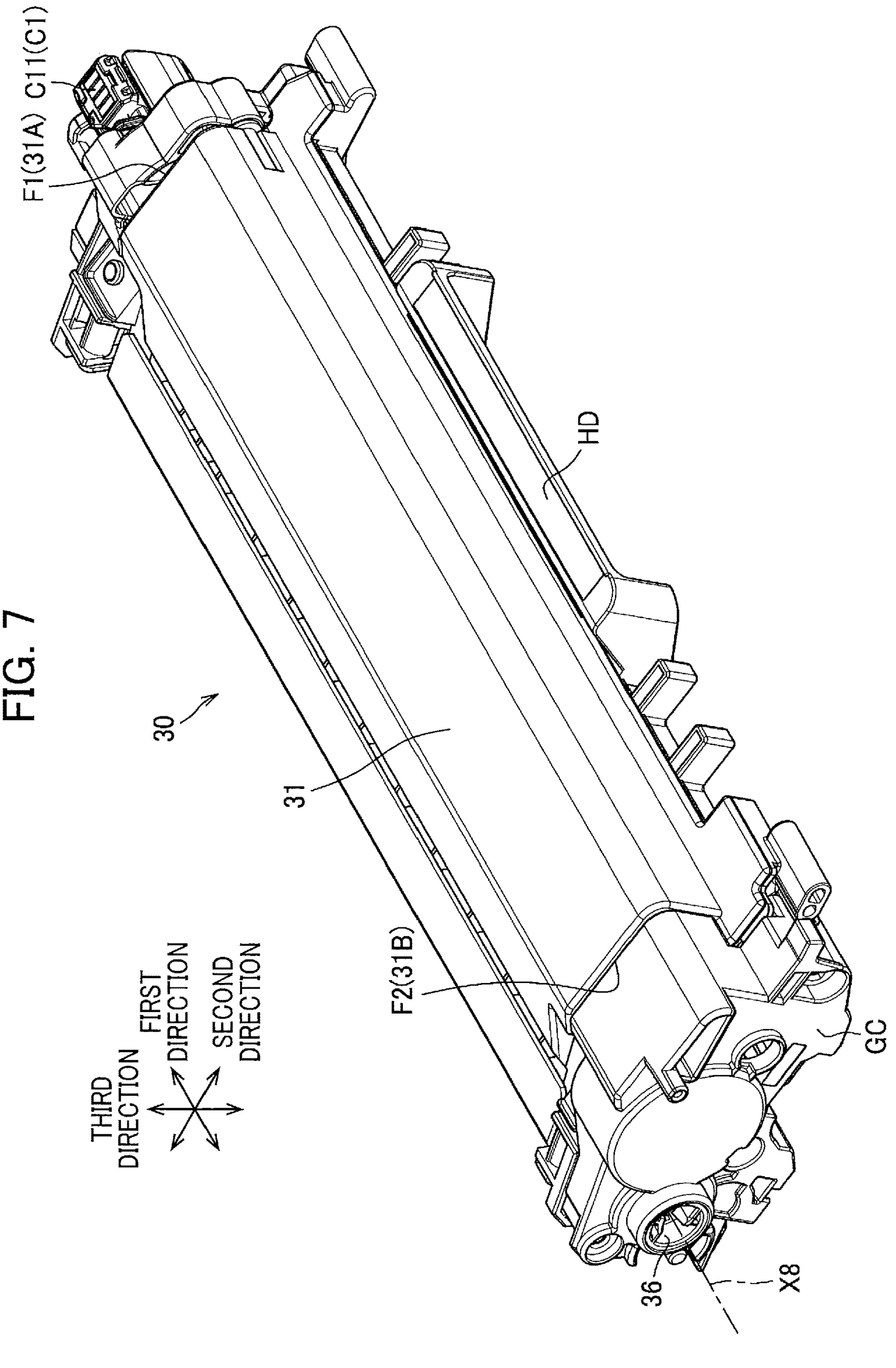
FIG. 7 is a perspective view for description of a structure of another end portion of the developing cartridge in the first direction.

As illustrated in FIG. 7, the developing cartridge 30 further includes a coupling 36. The coupling 36 is positioned at another end portion 31B of the casing 31 in the first direction. In other words, the coupling 36 is positioned at the second outer surface F2 of the casing 31.

The coupling 36 is configured to transmit a driving force to the developing roller 32, the supply roller 33, and the agitator 35. The coupling 36 is rotatable about a coupling axis X8 extending in the first direction. The coupling 36 is configured to receive the driving force from a drive source (not illustrated) of the main housing 10. The driving force transmitted from the drive source to the coupling 36 is configured to be transmitted to the developing roller 32, the supply roller 33, and the agitator 35 through non-illustrated gears.

Figure 8:
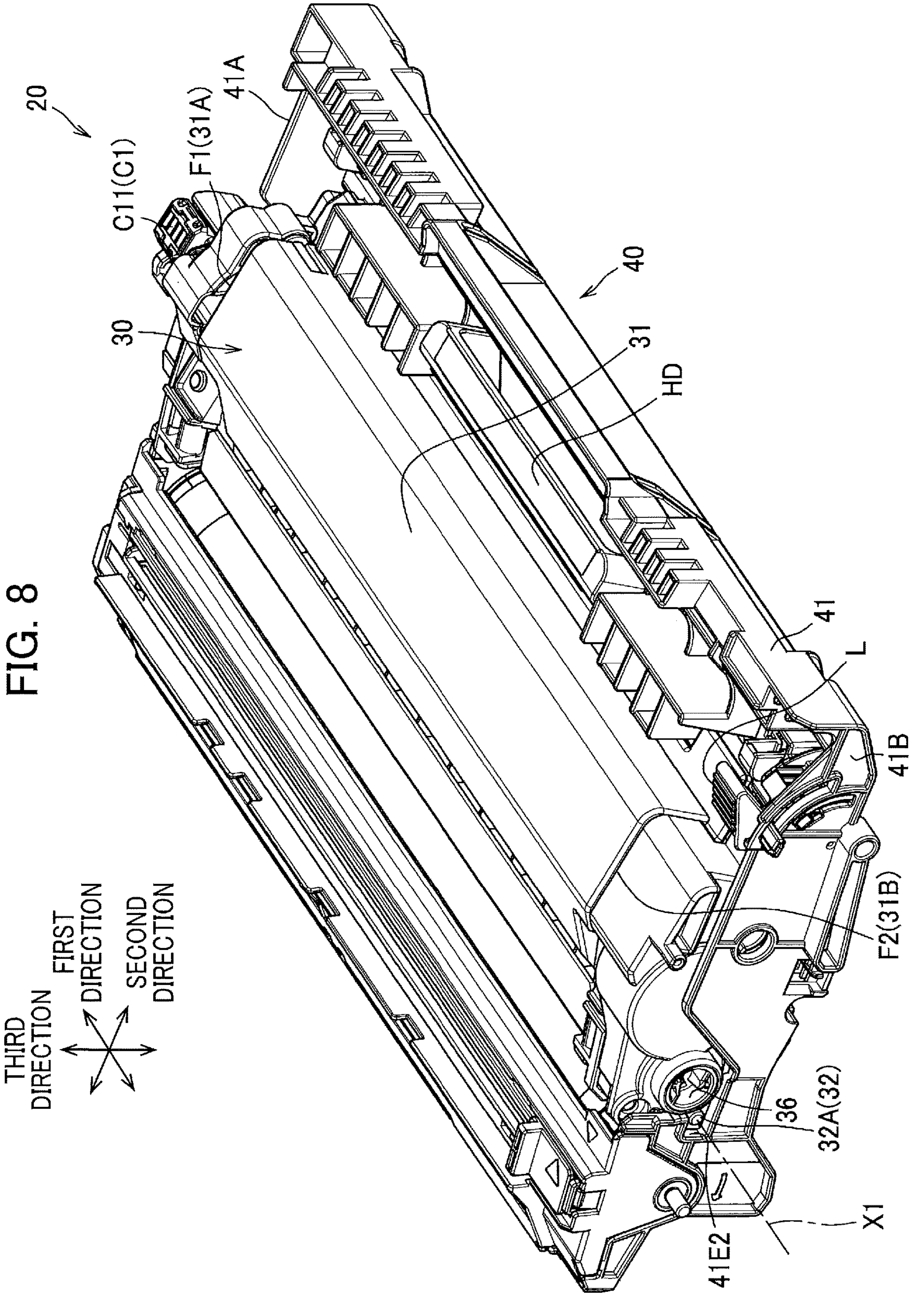
FIG. 8 is a perspective view for description of a structure of another end portion of the process cartridge in the first direction.

As illustrated in FIG. 8, the lock lever L is configured to lock the developing cartridge 30 to the drum frame 41. The drum frame 41 has one end portion 41A and another end portion 41B in the first direction. The lock lever L is positioned at the other end portion 41B of the drum frame 41 in the first direction. In the state where the developing cartridge 30 is attached to the drum flame 41, the electrical contact surface C11 is positioned opposite the lock lever L with respect to the casing 31 in the first direction.

Figure 9:
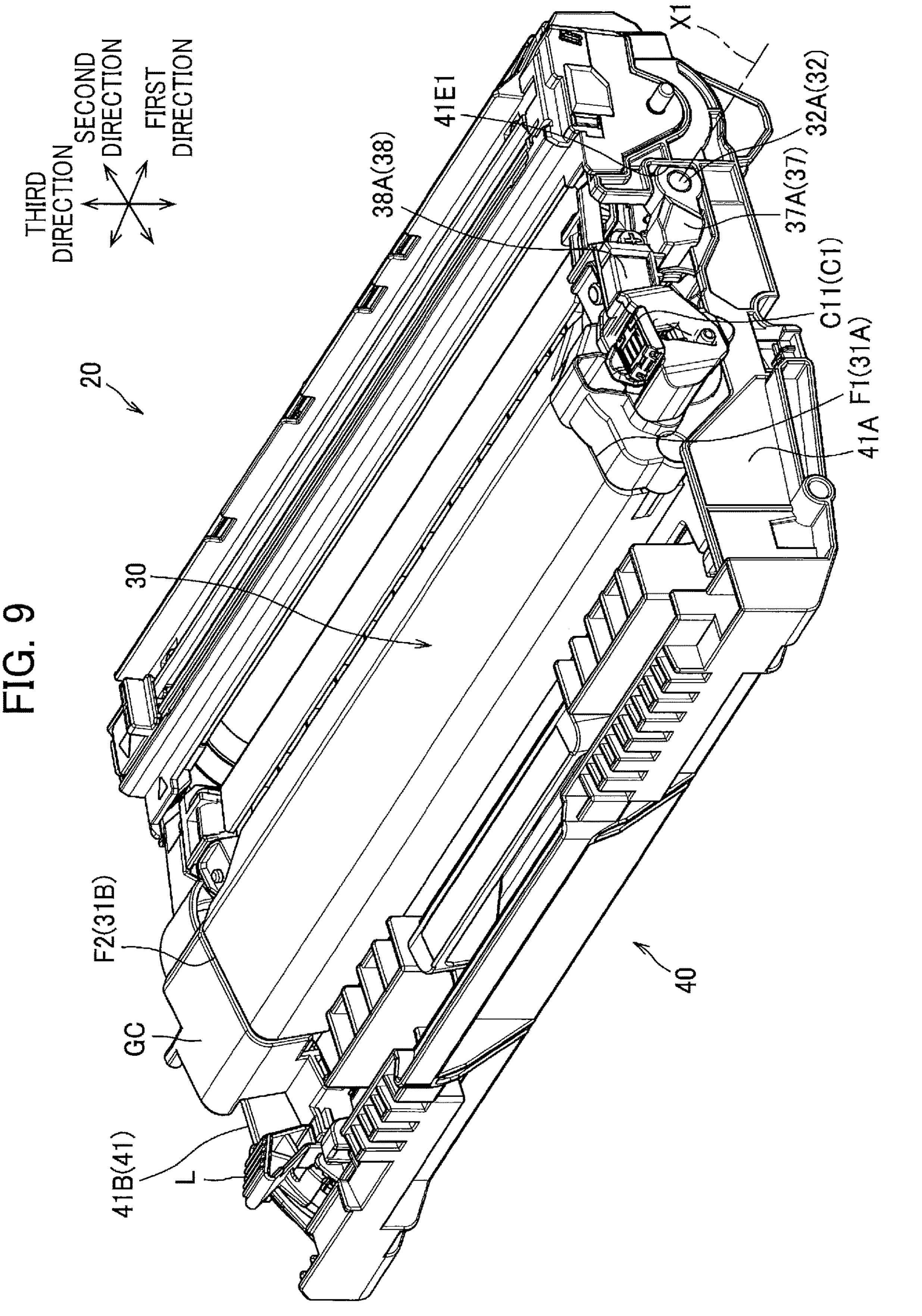
FIG. 9 is a perspective view for description of a structure of one end portion of the process cartridge in the first direction.
Figure 10A:
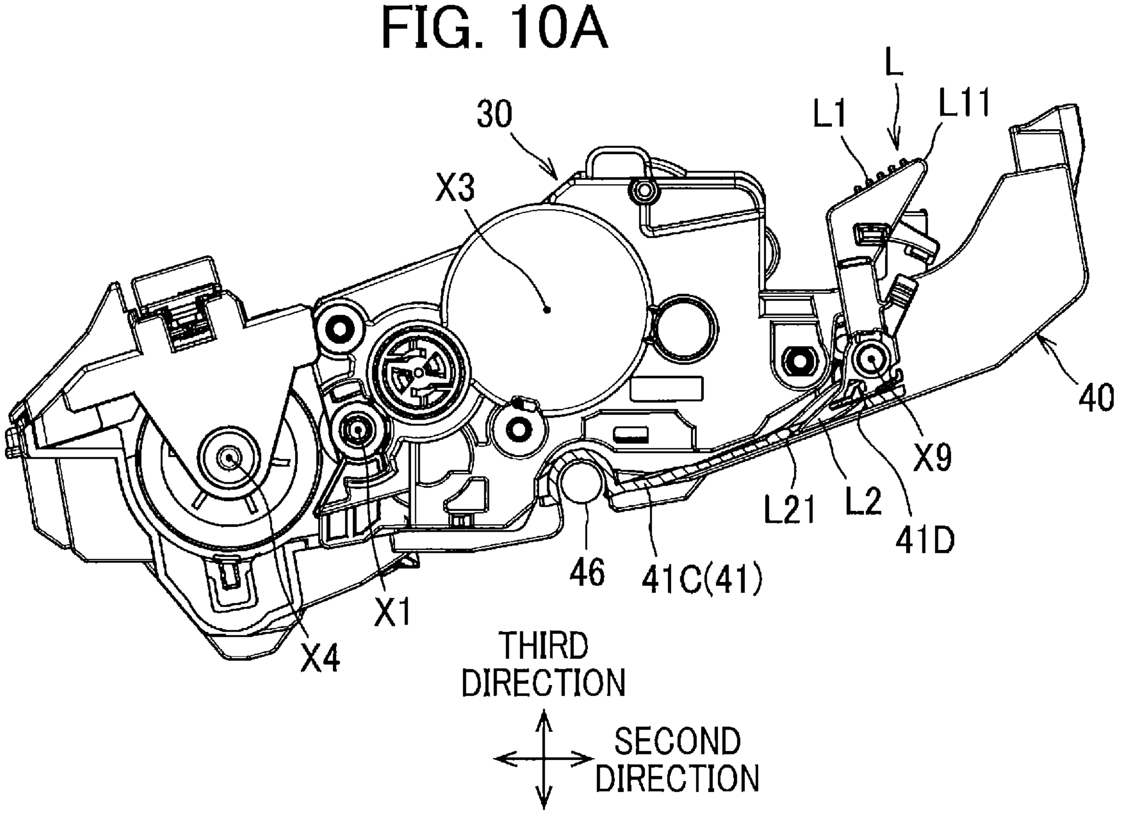
FIG. 10A is a side view of the process cartridge in which a side wall at another end portion of the drum frame in the first direction is removed, and illustrates a state where a lock lever is at a locking position.
Figure 10B:
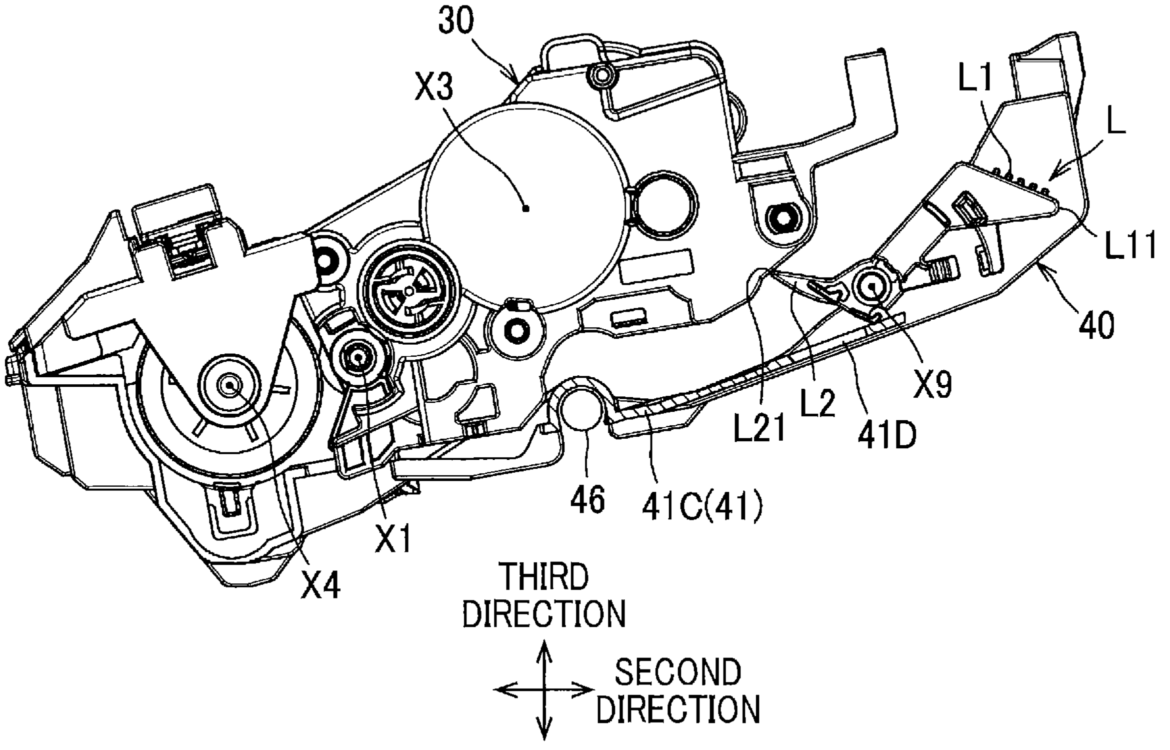
FIG. 10B is a side view of the process cartridge in which the side wall at the other end portion of the drum frame in the first direction is removed, and illustrates a state where the lock lever is at an unlocking position.

As illustrated in FIG. 9, the developing cartridge 30 further includes a gear cover GC. The gear cover GC is a cover that covers the gears for driving the developing roller 32, and the like. The gear cover GC is positioned at the other end 31B of the casing 31 in the first direction. The lock lever L contacts the gear cover GC. As illustrated in FIGS. 10A and 10B, the drum frame 41 includes a bottom wall 41C. The bottom wall 41C is positioned below the developing cartridge 30 in the state where the process cartridge 20 is attached to the main housing 10. The lock lever L is configured to lift up a part of the developing cartridge 30 in a direction away from the bottom wall 41C of the drum frame 41.

The lock lever L is pivotally movable about a lock axis X9 extending in the first direction. The lock lever L is pivotally movable between a locking position indicated in FIG. 10A and an unlocking position indicated in FIG. 10B. At the locking position, the lock lever L locks the developing cartridge 30 to the drum frame 41. At the unlocking position, the lock lever L unlocks the developing cartridge 30 from the drum frame 41.

The lock lever L includes an operation part L1 configured to be operated by a user, and a lifter part L2 configured to lift up the developing cartridge 30. The operation part L1 has a tip end L11 which is an end positioned farthest from the lock axis X9. The lifter part L2 has a tip end L21 which is an end positioned farthest from the lock axis X9.

The bottom wall 41C has a hole 41D. In a state where the lock lever L is at the locking position, the lifter part L2 of the lock lever L is in the hole 41D. In the state where the lock lever L is at the locking position, the lifter part L2 of the lock lever L is exposed to an outside of the drum frame 41. In a state where the lock lever L is at the unlocking position, the lifter part L2 is separated away from the hole 41D.

In the state where the lock lever L is at the locking position, the tip end L21 of the lifter part L2 is positioned between the developing cartridge 30 and the bottom wall 41C. In the state where the process cartridge 20 is attached to the main housing 10, the tip end L21 of the lifter part L2 is positioned below the lock axis X9. In the state where the process cartridge 20 is attached to the main housing 10, the tip end L11 of the operation part L1 is positioned above the lock axis X9.

The tip end L21 of the lifter part L2 is positioned farther away from the bottom wall 41C when the lock lever L is at the unlocking position than when the lock lever L is at the locking position. In the state where the lock lever L is at the unlocking position, the tip end L21 of the lifter part L2 is positioned farther from the bottom wall 41C than the lock axis X9 is from the bottom wall 41C.

As illustrated in FIGS. 8 and 9, the drum frame 41 has a first recessed portion 41E1, and a second recessed portion 41E2. In a state where the developing cartridge 30 is attached to the drum frame 41, one end portion in first direction of the developing-roller shaft 32A of the developing roller 32 is positioned in the first recessed portion 41E1. In the state where the developing cartridge 30 is attached to the drum frame 41, another end portion in the first direction of the developing-roller shaft 32A of the developing roller 32 is positioned in the second recessed portion 41E2. The first recessed portion 41E1 is positioned at the one end portion 41A of the drum frame 41. The second recessed portion 41E2 is positioned at the other end portion 41B of the drum frame 41. The first recessed portion 41E1 and the second recessed portion 41E2 are configured to restrict movement of the developing-roller shaft 32A in the third direction. With this structure, as illustrated in FIGS. 10A and 10B, the developing cartridge 30 is allowed to pivotally move in the third direction about the developing axis X1.

When the lock lever L is at the locking position, the developing cartridge 30 is at a contacting position where the developing cartridge 30 is in contact with the bottom wall 41C. When the lock lever L is at the unlocking position, the developing cartridge 30 is at a separated position where the developing cartridge 30 is separated away from the bottom wall 41C.

As illustrated in FIG. 11, the drum cartridge 40 further includes a pressure member P configured to press the developing roller 32 against the photosensitive drum 42. The pressure member P includes a first pressure member P1 and a second pressure member P2. The first pressure member P1 is positioned at the one end portion 41A of the drum frame 41 in the first direction. The second pressure member P2 is positioned at the other end portion 41B of the drum frame 41 in the first direction.

In the state where the developing cartridge 30 is attached to the drum frame 41, the electrical contact surface C11 is positioned opposite the lock lever L in the first direction with respect to the first pressure member P1 and the second pressure member P2. The developing cartridge 30 includes a first counter-pressure portion 31C and a second counter-pressure portion 31D. The first pressure member P1 is configured to contact the first counter-pressure portion 31C. The second pressure member P2 is configured to contact the second counter-pressure portion 31D.

According to the above-described structure, the following technical advantages can be obtained in the present embodiment.

As illustrated in FIG. 5, since the electrical contact surface C11 is positioned opposite the developing electrode 37 in the second direction with respect to the supply electrode surface 38A which is a part of the supply electrode 38, the electrical contact surface C11 can be located far away from the developing roller 32. Accordingly, contamination of the electrical contact surface C11 with the toner can be restrained.

As illustrated in FIGS. 8 and 9, the developing electrode 37, the supply electrode 38, and the electrical contact surface C11 are positioned at the one end portion 31A of the casing 31 in the first direction, while the coupling 36 is positioned at the other end portion 31B of the casing 31 in the first direction. With this configuration, vibration of the coupling 36 is less likely to be transmitted to the developing electrode 37, the supply electrode 38, and the electrical contact surface C11.

The electrical contact surface C11 is positioned opposite the lock lever L with respect to the casing 31 in the first direction in the state where the developing cartridge 30 is attached to the drum frame 41. With this structure, when the user operates the lock lever L, user's fingers hardly touch the electrical contact surface C11, thereby suppressing contamination of the electrical contact surface C11.

Incidentally, the present disclosure is not limited to the above-described embodiment, but various modifications as illustrated below may be made.

According to the above-described embodiment, the single circuit board C12 integrally includes the electrical contact surface C11 and the memory. However, the electrical contact surface and the memory may be configured independently of each other. Incidentally, in this case, the electrical contact surface may be electrically connected to the memory through a harness.

Each part and component described in the depicted embodiment and the modifications may be combined together arbitrarily.

What is claimed is:

1. A developing cartridge comprising:

a casing configured to accommodate toner therein;

a developing roller rotatable about a developing axis extending in a first direction, the developing roller being positioned at one end portion of the casing in a second direction crossing the first direction;

a developing electrode electrically connected to the developing roller, the developing electrode being positioned at one end portion of the casing in the first direction;

a supply roller rotatable about a supply axis extending in the first direction, the supply roller being configured to supply toner to the developing roller;

a supply electrode electrically connected to the supply roller, the supply electrode being positioned at the one end portion of the casing in the first direction; and an IC chip having an electrical contact surface positioned at the one end portion of the casing in the first direction, wherein the electrical contact surface is positioned opposite the developing electrode with respect to a part of the supply electrode in the second direction.

2. The developing cartridge according to claim 1, wherein the second direction is perpendicular to the first direction.

3. The developing cartridge according to claim 1, further comprising a handle positioned at another end portion of the casing in the second direction.

4. The developing cartridge according to claim 3, wherein the supply roller is positioned between the developing roller and the handle in the second direction.

5. The developing cartridge according to claim 1, wherein the developing electrode is made of electrically conductive resin.

6. The developing cartridge according to claim 1, wherein the supply electrode is made of electrically conductive resin.

7. The developing cartridge according to claim 1, wherein the developing roller includes a developing-roller shaft extending in the first direction, wherein the developing electrode includes:

a developing bearing having a developing through-hole through which the developing-roller shaft is inserted; and a developing electrode surface electrically connected to the developing bearing, and wherein the developing electrode surface is positioned at the one end portion of the casing in the first direction.

8. The developing cartridge according to claim 7, wherein the developing electrode surface extends perpendicular to the first direction.

9. The developing cartridge according to claim 7, wherein the supply roller includes a supply-roller shaft extending in the first direction, wherein the supply electrode includes:

a supply bearing having a supply through-hole through which the supply-roller shaft is inserted; and a supply electrode surface electrically connected to the supply bearing, and wherein the supply electrode surface is positioned at the one end portion of the casing in the first direction.

10. The developing cartridge according to claim 9, wherein the supply electrode surface extends perpendicular to the first direction.

11. The developing cartridge according to claim 9, wherein the electrical contact surface is positioned opposite the developing electrode surface with respect to the supply electrode surface in the second direction.

12. The developing cartridge according to claim 9, further comprising an insulating member positioned between the developing electrode and the supply electrode.

13. The developing cartridge according to claim 9, wherein the electrical contact surface is positioned opposite the developing electrode surface with respect to the supply electrode surface in a third direction crossing the first direction and the second direction.

14. The developing cartridge according to claim 13, wherein the third direction is perpendicular to the first direction and the second direction.

15. The developing cartridge according to claim 1, further comprising a coupling configured to transmit a driving force to the developing roller and the supply roller, the coupling being positioned at another end portion of the casing in the first direction.

16. The developing cartridge according to claim 1, wherein the electrical contact surface is movable relative to the casing.

17. The developing cartridge according to claim 1, wherein the developing cartridge is attachable to and detachable from a drum frame of a drum cartridge, the drum cartridge including:

a photosensitive drum rotatable about a drum axis, the drum axis extending in the first direction in a state where the developing cartridge is attached to the drum frame; and a lock lever configured to lock the developing cartridge to the drum frame, wherein the electrical contact surface is positioned opposite the lock lever in the first direction with respect to the casing in the state where the developing cartridge is attached to the drum frame.

18. The developing cartridge according to claim 17, wherein the drum cartridge further includes a pressure member configured to press the developing roller against the photosensitive drum, and wherein the electrical contact surface is positioned opposite the lock lever in the first direction with respect to the pressure member in the state where the developing cartridge is attached to the drum frame.

19. The developing cartridge according to claim 1, wherein the casing has a first outer surface and a second outer surface spaced apart from the first outer surface in the first direction, and wherein the developing electrode and the supply electrode are positioned at the first outer surface.

20. The developing cartridge according to claim 19, wherein a distance in the first direction between the first outer surface of the casing and the electrical contact surface is greater than a distance in the first direction between the first outer surface of the casing and the developing electrode.

21. The developing cartridge according to claim 20, wherein the distance in the first direction between the first outer surface of the casing and the electrical contact surface is greater than a distance in the first direction between the first outer surface of the casing and the supply electrode.

22. The developing cartridge according to claim 1, wherein the developing electrode includes a developing protrusion protruding in the first direction and positioned at the one end portion of the casing in the first direction, wherein the supply electrode includes a supply protrusion protruding in the first direction and positioned at the one end portion of the casing in the first direction, and wherein the electrical contact surface is positioned opposite the developing protrusion with respect to the supply protrusion in the second direction.

23. The developing cartridge according to claim 22, wherein the developing protrusion has a developing electrode surface, wherein the supply protrusion has a supply electrode surface, and wherein the electrical contact surface is positioned opposite the developing electrode surface with respect to the supply electrode surface in the second direction.

* * * * *